(12) United States Patent
Buddendick et al.

(10) Patent No.: US 11,099,258 B2
(45) Date of Patent: Aug. 24, 2021

(54) METHOD AND SYSTEM FOR SCANNING AN OBJECT

(71) Applicant: Robert Bosch GmbH, Stuttgart (DE)

(72) Inventors: Hermann Buddendick, Sindelfingen (DE); Markus Schlosser, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 16/309,704

(22) PCT Filed: May 10, 2017

(86) PCT No.: PCT/EP2017/061115
§ 371 (c)(1),
(2) Date: Dec. 13, 2018

(87) PCT Pub. No.: WO2018/010866
PCT Pub. Date: Jan. 18, 2018

(65) Prior Publication Data
US 2019/0137606 A1    May 9, 2019

(30) Foreign Application Priority Data
Jul. 15, 2016 (DE) .......................... 102016213007.2

(51) Int. Cl.
*G01S 7/41* (2006.01)
*G01S 13/34* (2006.01)
(Continued)

(52) U.S. Cl.
CPC ............ *G01S 7/415* (2013.01); *G01S 13/343* (2013.01); *G01S 13/42* (2013.01); *G01S 13/536* (2013.01);
(Continued)

(58) Field of Classification Search
CPC ........ G01S 7/415; G01S 13/343; G01S 13/42; G01S 13/536; G01S 13/584;
(Continued)

(56) References Cited

U.S. PATENT DOCUMENTS 9,041,592 B2 * 5/2015 Jeon ...................... G01S 13/582
342/90
9,575,160 B1 * 2/2017 Davis ...................... G01S 7/352
(Continued)

FOREIGN PATENT DOCUMENTS

DE 102004047086 A1 3/2006
DE 102011121560 A1 * 6/2013 ............. G01S 7/415
(Continued)

OTHER PUBLICATIONS

International Search Report for PCT/EP2017/061115, dated Jul. 20, 2017.
(Continued)

*Primary Examiner* — Bernarr E Gregory
*Assistant Examiner* — Alexander L. Syrkin
(74) *Attorney, Agent, or Firm* — Norton Rose Fulbright US LLP; Gerard Messina

(57) ABSTRACT

A system for scanning an object from the direction of a motor vehicle includes a first radar device for scanning a first item of information of the object that includes a distance, a first object angle, and a first relative velocity; a periodic continuous-wave radar device for scanning a second item of information of the object, which includes a second relative velocity and a second object angle; and a processing device for allocating the first and the second items of information with regard to the same object; and for classifying the object on the basis of a characteristic of the second relative velocity.

10 Claims, 3 Drawing Sheets

(51) Int. Cl.
  *G01S 13/42* (2006.01)
  *G01S 13/536* (2006.01)
  *G01S 13/58* (2006.01)
  *G01S 13/931* (2020.01)

(52) U.S. Cl.
  CPC .......... *G01S 13/584* (2013.01); *G01S 13/589* (2013.01); *G01S 13/931* (2013.01); *G01S 2013/93271* (2020.01)

(58) Field of Classification Search
  CPC ................. G01S 13/589; G01S 13/931; G01S 2013/93271; G01S 13/878; G01S 13/426
  USPC .......................................................... 342/107
  See application file for complete search history.

(56) References Cited

U.S. PATENT DOCUMENTS

| | | | | |
|---|---|---|---|---|
| 2005/0275584 | A1* | 12/2005 | Hager | G05D 1/102 342/120 |
| 2008/0186223 | A1* | 8/2008 | Mayer | G01S 7/4004 342/109 |
| 2012/0001787 | A1* | 1/2012 | van Dorp | G01S 13/87 342/28 |
| 2014/0333467 | A1* | 11/2014 | Inomata | G01S 13/867 |
| 2015/0153447 | A1* | 6/2015 | Lee | G01S 13/536 342/27 |
| 2016/0003939 | A1* | 1/2016 | Olshansky | G01S 13/06 |
| 2016/0259037 | A1* | 9/2016 | Molchanov | G06K 9/00355 |
| 2016/0320854 | A1* | 11/2016 | Lien | G01S 7/354 |
| 2017/0328995 | A1* | 11/2017 | Marschalkowski | H04W 4/029 |
| 2017/0329002 | A1* | 11/2017 | Koerber | G01S 13/87 |
| 2017/0354160 | A1* | 12/2017 | Doring | A23L 5/21 |
| 2017/0364160 | A1* | 12/2017 | Malysa | G06F 3/03 |
| 2018/0356509 | A1* | 12/2018 | Haghighi | G01S 7/41 |

FOREIGN PATENT DOCUMENTS

| | | | |
|---|---|---|---|
| DE | 102011121560 A1 | 6/2013 | |
| DE | 102013018752 A1 | 5/2015 | |
| DE | 102014009651 A1 | 6/2015 | |
| DE | 102015109759 A1 | 1/2016 | |
| DE | 102014118031 A1 | 6/2016 | |
| DE | 102015013389 A1 * | 4/2017 | ........... G01S 13/282 |
| EP | 2806287 A1 | 11/2014 | |
| JP | 2012189338 A | 10/2012 | |
| JP | 2014006072 A | 1/2014 | |
| JP | 2016023946 A | 2/2016 | |

OTHER PUBLICATIONS

Singh and Kim: "Analysis of Human Kinetics using Millimeter-wave Micro-Doppler Radar", Procedia Computer Science 84 (2016), pp. 36-40.

* cited by examiner

METHOD AND SYSTEM FOR SCANNING AN OBJECT

FIELD

The present invention relates to scanning of an object with the aid of radar signals. In particular, the present invention relates to the more precise determination of an object in the environment of a motor vehicle.

BACKGROUND INFORMATION

A radar system is developed to emit a radar signal and to compare the radar signal reflected at an object to the emitted radar signal. A number of different varieties by which different information is able to be collected about the object are available. One conventional variant is the FMCW (Frequency Modulated Continuous Wave) radar, in which case the emitted radar signal is modulated using a sawtooth function. A distance of the object from the radar system is then able to be determined with satisfactory accuracy. An object angle, which indicates in which direction from the direction of the radar sensor the object can be found is able to be obtained using a plurality of antennas or through the control of one antenna in such a way that the signals are emitted in predefined directions.

A Doppler shift of the reflected radar signal relative to the emitted radar signal may point to a relative velocity of the object in relation to the radar system. An object that is moving, e.g., a pedestrian, whose arms and legs swing back and forth, exhibits characteristic, frequently periodic fluctuations in the measurable Doppler frequencies. Frequencies of the fluctuations are able to be analyzed in order to allow for a more precise classification of the object.

German Patent Application No. DE 10 2015 109 759 A1 describes controlling a radar system on board a motor vehicle in such a way that a micro-Doppler analysis can be carried out.

For the classification of an object with the aid of a radar system that is mobile itself, such as on board a motor vehicle, a complex modulation may be used, e.g., featuring chirp sequences. However, the pertinent processing may be very complex in such a case. For instance, a two-dimensional Fourier analysis of the differential signal between the transmit and receive signal may be required, which means that a powerful processing device is indispensable.

One object of the present invention is to provide a simple technique for scanning an object from the direction of a motor vehicle. The present invention may achieve this object. Preferred specific embodiments of the present invention are described herein.

SUMMARY

A system for scanning an object from the direction of a motor vehicle includes a first radar device for scanning a first item of information of the object including a distance, a first object angle, and a first relative velocity; a continuous-wave radar device for scanning a second item of information of the object including a second relative velocity and a second object angle; and a processing device for allocating the first and second items of information with regard to the same object, and for classifying the object on the basis of a characteristic of the second relative velocity.

The classification may particularly encompass a comparison of the characteristic of the second relative velocity with a predefined characteristic. The characteristic may point to a movement pattern of the object. The characteristic may include a spectrum of different relative velocities or a temporal change in the spectrum, so that an object that exhibits different relative velocities at different locations with respect to the second radar device is able to be determined in an improved manner. In one particularly preferred embodiment, it is possible to determine whether the object involves a pedestrian. The pedestrian is in motion and different body parts move at different velocities relative to the radar devices. A velocity distribution of the object over time may be characteristic of a pedestrian.

In accordance with the present invention, a spectrum of relative velocities is determined with the aid of the (second) continuous-wave radar device and this information is correlated with individual objects that are scanned by the first radar device. In this way, a precise analysis of individual objects may be successful even in complex scenarios that involve a plurality of objects at different distances or at different velocities.

The system may allow for a combination of the advantages of different radar devices in order to analyze both precise information with regard to the type of movement of the object and precise information with regard to the location and the change in location of the object. In particular, the analysis of precise velocity information of the object may be successful even if the motor vehicle that includes the radar devices is moving in relation to the environment.

The classification of the object may be considerably improved; in particular the determination of an object as a pedestrian is able to be carried out in a more optimal manner, so that, for example, a driving assistance system, an active or a passive accident-protection device on board the motor vehicle is able to be controlled in a better manner. For instance, if it is determined that the pedestrian is on a collision course with the motor vehicle, a signal for warning a driver or the pedestrian is able to be output. In one further embodiment, an automatic braking operation may be triggered as well.

The first radar device may use any type of measuring principle. In one preferred specific embodiment, this is the FMCW method (Frequency Modulated Continuous Wave) which normally utilizes frequency ramps of a continuous radar signal. Other embodiments are also possible; for example, a radar device in which the individual solid angles are mechanically or electronically scanned one after the other in order to determine the object angle may be used. Regardless of the modulation method that is employed, the measuring duration for each individually scanned solid angle would otherwise be prolonged according to the desired speed resolution in this spatial scanning.

The processing device is preferably set up to carry out a micro-Doppler analysis of the signals of the continuous-wave radar device. The micro-Doppler analysis allows for a better determination as to whether a movement pattern of an object corresponds to a known movement pattern of a pedestrian. It is even possible to determine which activity the pedestrian is engaged in.

Signals of individual FMCW ramps of the first radar device are preferably processed separately of one another. For this purpose, the FMCW ramps are analyzed, preferably with the aid of a one-dimensional Fourier transform. This may require considerably less processing power than the two-dimensional Fourier transform with chirp sequences. To separate the different objects, the detected frequency peaks may be combined with one another across different ramps following the Fourier analysis.

Furthermore, the two radar devices are preferably operated in alternation. This makes it easier to carry out scanning in the same frequency range.

The two radar devices may be integrated into one, the integrated radar device being operated in sequence using different signals. At one instant, for example, it may be operated using either a FMCW or a continuous-wave signal. The operating types may particularly be activated in alternation. Saving a radar device provides cost savings. A conventional radar device is able to be expanded into the described system at a reasonable expense.

The continuous-wave operation preferably lasts longer than a frequency ramp of the FMCW operation. For example, the continuous-wave operation may be carried out across a period of approximately 15 to 25 ms, and in other variants across 10 to 15 ms or 25 to 30 ms, for example. The accuracy of the velocity determination with the aid of a Doppler frequency is thereby able to be significantly increased.

In the mentioned variant featuring the micro-Doppler analysis, a differential signal between the emitted and the continuous-wave radar signal reflected at the object is able to be analyzed with regard to its frequency distribution. The analysis may be carried out using a Fourier transform, in particular. In the process, the signal energies in predefined frequency ranges are able to be computed. The frequency distribution is also able to be analyzed in its temporal characteristic so that, for example, a movement pattern of a walking or running pedestrian is able to be determined in a more optimal manner.

Preferably, only such frequencies that lie below a predefined limit frequency should be examined, the limit frequency being defined on the basis of the velocity of the radar devices with respect to the environment. In this way, preferably only signal components that are allocated to objects approaching the radar device more rapidly than the radar device is moving with respect to the environment are taken into account, i.e., objects that are moving themselves relative to the environment. The Doppler frequency of these objects is correspondingly lower (greater in absolute terms) than the particular Doppler frequency that corresponds to the negative ego velocity. In addition, these signal components should also lie above a noise level.

A method for scanning an object from the direction of a motor vehicle includes steps of scanning a first item of information of the object with the aid of FMCW radar scanning, the first item of information including a distance, a first object angle and a first relative velocity; of scanning a second item of information of the object with the aid of continuous-wave radar scanning, the second item of information including a second relative velocity and a second object angle; of allocating the first and the second items of information with regard to the same object; and of determining that the object includes a pedestrian if a temporal change in the second relative velocity of the object points to a predefined movement pattern of the object.

Features or specific embodiments of the present method and the present system correspond to one another, which means that they are able to be transferred between the two categories or exchanged for one another.

BRIEF DESCRIPTION OF THE DRAWINGS

The present invention is described in greater detail below 0 with reference to the figures.

DETAILED DESCRIPTION OF EXAMPLE EMBODIMENTS

Figure 1:
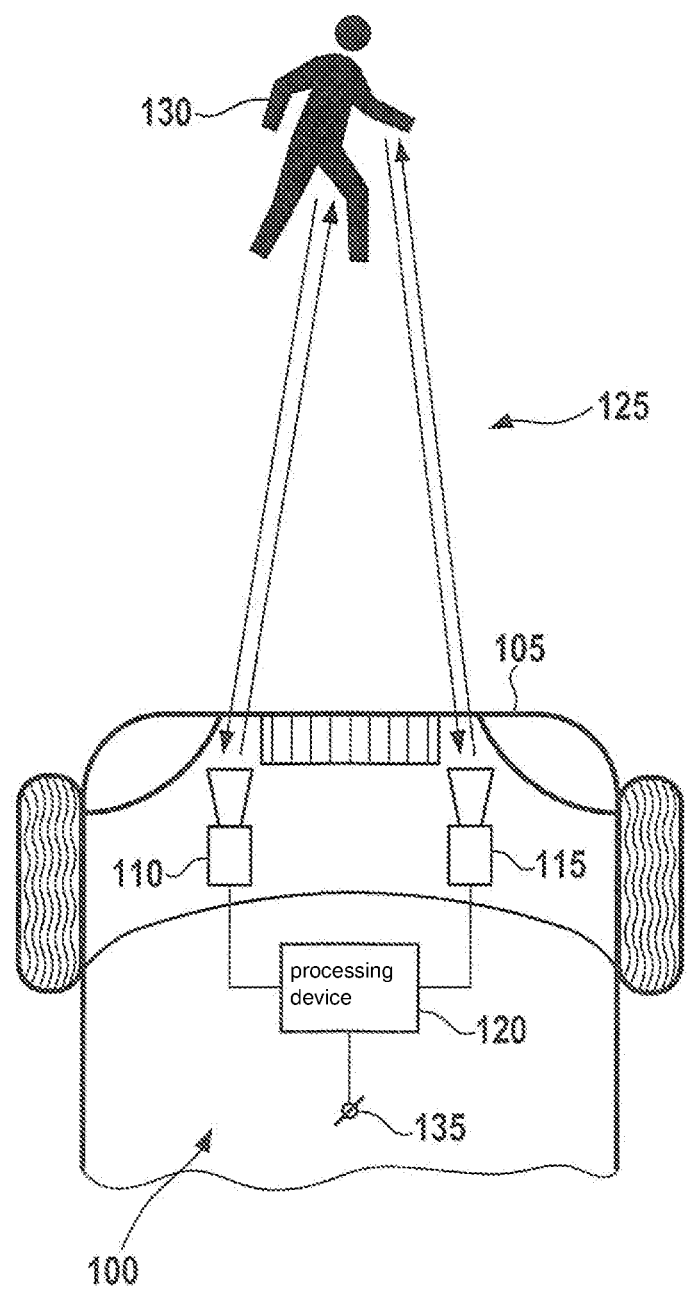
FIG. 1 shows a system.

FIG. 1 shows a system 100, which encompasses a motor vehicle 105, a first radar device 110, a second radar device 115, and a processing device 120. The two radar devices 110, 115 may also be developed so as to form one integrated radar device 110, 115, in which case an alternating operation as first radar device 110 and second radar device 115 is preferred. Radar devices 110, 115 and processing device 120 are mounted on board motor vehicle 105, which is able to move in relation to an environment 125. An object 130, which is represented by a pedestrian in this case, is located in environment 125. It is the task of system 100 to scan object 130 with the aid of radar signals and to determine the location, movement and classification information of object 130. The determined information may be supplied with the aid of an interface 135. Interface 135 is connectable to a warning or control device on board motor vehicle 105.

Object 130, too, is able to move in relation to environment 125. In addition, object 130 may move in itself or exhibit micro movements. Parts of object 130 may move at a different velocity than object 130 in relation to environment 125. In this case, not only a Doppler frequency but also an entire range of Doppler frequencies is able to be measured with the aid of radar device 110, 115.

For instance, pedestrian 130 may move at a velocity of 5 km/h in relation to environment 125. Because of the periodic movement of the legs (and frequently also the arms) of pedestrian 130, his or her Doppler-frequency spread fluctuates periodically as well. When both feet are on the ground, the maximum velocity is given by the torso. Along the legs, this speed is reduced down to zero at the feet. Therefore, any Doppler frequencies that correspond to velocities between zero and the speed of the torso are potentially measurable. This is also the instant of the lowest Doppler-frequency spread. During the forward swing, on the other hand, a foot reaches up to three or four times the velocity of the torso.

In order to determine the spectrum of the velocities of object 130 with sufficient precision without requiring a complex modulation and a complex analysis of the radar signals, it is provided to determine a location and/or a low-resolution movement of object 130 with the aid of first radar device 110, which uses a conventional FMCW signal. In addition, the micro movements of object 130 are determined with the aid of second radar device 115 and analyzed, preferably using a micro-Doppler analysis. The second radar device preferably utilizes a continuous-wave signal, or in other words, does not modulate the emitted radar signal over time. The determination using the continuous-wave signal is able to be carried out for longer than the duration of a conventional ramp of the FMCW method, such as approximately 20 ms, in order to achieve an adequate velocity resolution.

For the continuous-wave signal, only the Doppler has an effect on the received signal, whereas the distance of object 130 is not relevant. The difference, and thus the Doppler frequency, corresponds directly to a physical velocity of object 130 in relation to motor vehicle 105. Since no distance is able to be determined for the continuous-wave signal, the separation of the scene into individual objects 130 must continue to be carried out using the classic FMCW method. However, both radar devices 130 are able to determine the velocity and the angle of object 130 in relation to radar devices 110, 115, so that, most of the time, it is possible to unambiguously allocate the micro-Doppler effect to one of detected objects 130.

Unfortunately, due to the low velocity, it is difficult to distinguish a pedestrian 130 from a stationary object 130. As a result, the allocation of a measured micro-Doppler effect to one of objects 130 potentially detected as moving is mainly possible via the angle information and especially via the comparison between the temporal characteristic of the micro-Doppler angle and the temporal characteristic of the object angles. Even for moved rigid bodies that have no micro-Doppler, the high velocity resolution of the continuous-wave signal allows for a refinement of the original velocity estimate purely on the basis of the FMCW ramps. In this case, the allocation via the velocity is particularly easy because the relatively few objects present in the scene usually differ significantly in their velocities.

Finally, the continuous-wave signal is able to be analyzed quasi-completely separately from the classic FMCW ramps. Because of the expansion, only minimal changes in the processing of a known radar device are required in order to form system 100.

Figure 2:
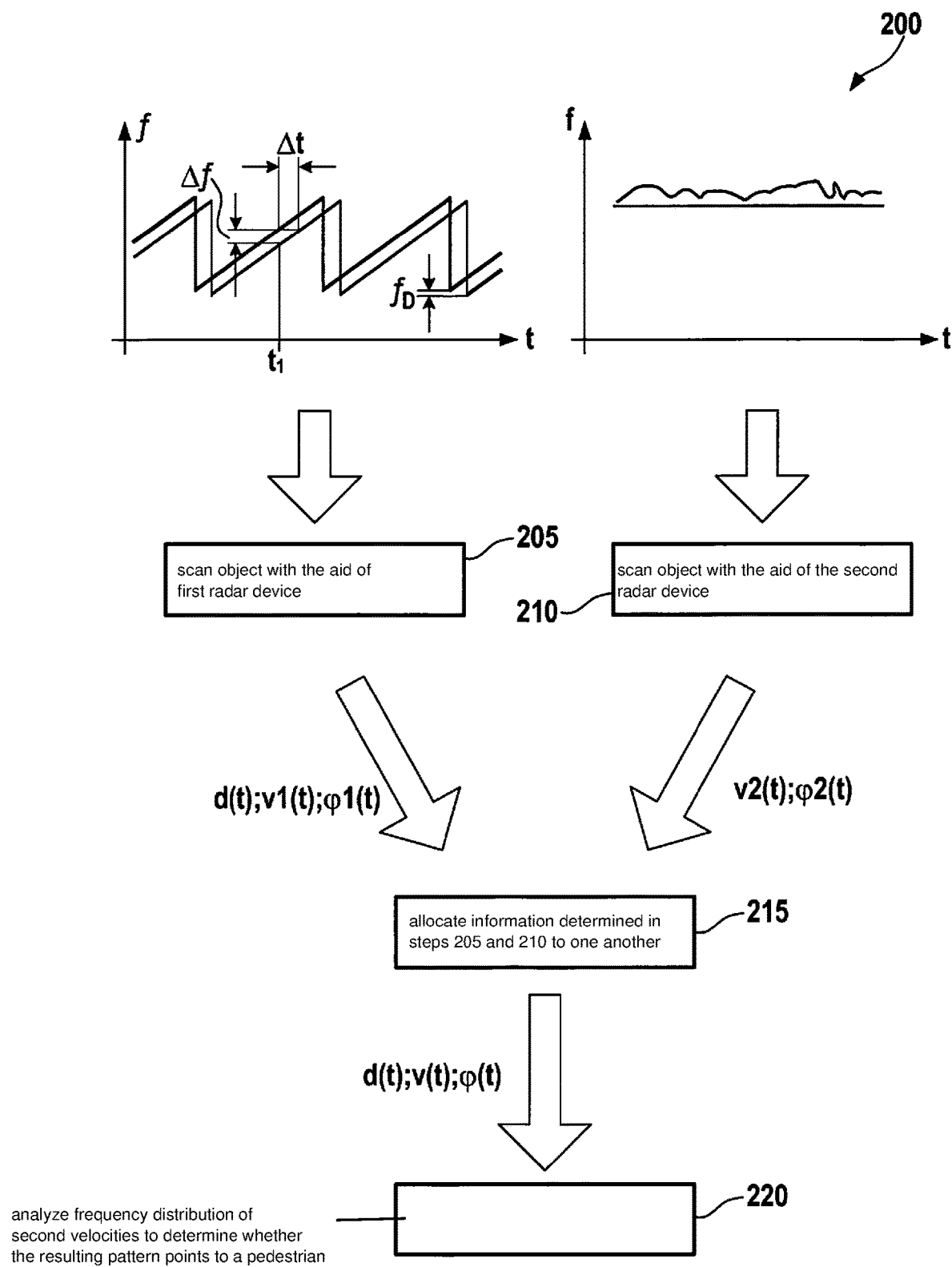
FIG. 2 shows a flow diagram of a method.

FIG. 2 shows a flow diagram 200 of a method for determining information regarding an object 130; the information should especially include a location or a movement of object 130 and a distribution of frequencies of micro movements.

In a step 205, object 130 is scanned with the aid of first radar device 110, preferably on the basis of an FMCW signal. Other radar methods are also possible as an alternative. The emitted and the reflected signal are sketched in terms of quality over step 205 in a time diagram. This determination is well understood in radar technology and is able to be carried out in a variety of conventional ways. Preferably, a first distance d(t), a first velocity v1 (t) and a first angle φ(t) are determined as the results of the scanning.

In a step 210, which is able to be carried out in alternation with step 205, object 130 is scanned with the aid of second radar device 115 on the basis of a radar signal having a constant frequency (continuous-wave signal). The diagram sketched over step 210 sketches the emitted and the reflected signal. Preferably, a second velocity v2(t) and a second angle φ2(t) are determined as the results of the scanning. The second velocity preferably has a very high resolution and allows for a micro-Doppler analysis (MDA).

In a step 215, the information determined in steps 205 and 210 is allocated to one another. First item of information and second item of information, each including identical angles and, furthermore preferred, identical time developments of their angles, relate to the same object 130 and may be allocated to one another. Step 215 preferably provides a distance d(t), a velocity v(t), and an angle φ(t) as a combination of the first and the second items of information.

In a step 220, the frequency distribution of the second velocities is able to be analyzed in order to determine whether the resulting pattern points to a pedestrian. Corresponding patterns or characteristics of such patterns may be defined in advance. The result of the determinations is subsequently able to be output.

Signal Processing

The processing of the continuous-wave signal of second radar device 115 is essentially identical to that of FMCW ramps, e.g. of first radar device 110. A non-coherent integration across all receive channels is followed by a spectral analysis using a Fourier transform. In the process, the signal is broken down into frequencies of which it is composed. Then, the power of the frequency components in each frequency bin is determined.

However, in contrast to FMCW ramps, there is no need here to detect frequency peaks (and allocate them to one another). Each frequency bin that has a power above the noise level directly indicates the presence of a physical object 130 together with the corresponding velocity (in the radial direction). For an object 130 featuring a micro-Doppler effect, this is naturally also given for an entire frequency spectrum. The angle estimate, too, is practically the same as in FMCW ramps. Once again, only the detection of individual frequency peaks is omitted. Furthermore, there is only a single continuous-wave signal for which an angle is able to be determined so that the calculation of an angle per ramp is also unnecessary. However, given an available micro-Doppler, the individual frequency bins take the place of the different ramps.

Physical Observations Regarding the Evaluation Range

In the automotive field, as already mentioned, the ego movement of second radar device 115 makes the micro-Doppler analysis of a pedestrian 130 more difficult. For a moved radar device 115, it looks as if a stationary object 130 directly ahead were moving towards it at its own velocity. At a lateral offset, this apparent velocity is reduced by the cosine of the viewing angle. At the instant of passing (i.e., at 90 degrees), object 130 appears to come to a brief stop before moving away from second radar device 115 toward the rear. Therefore, the reflected power of stationary object 130 in the spectrum is limited to the particular frequencies that correspond to the velocities between zero and the negative ego velocity. The velocity of motor vehicle 105 in relation to environment 125 is denoted as the ego velocity.

Figure 3:
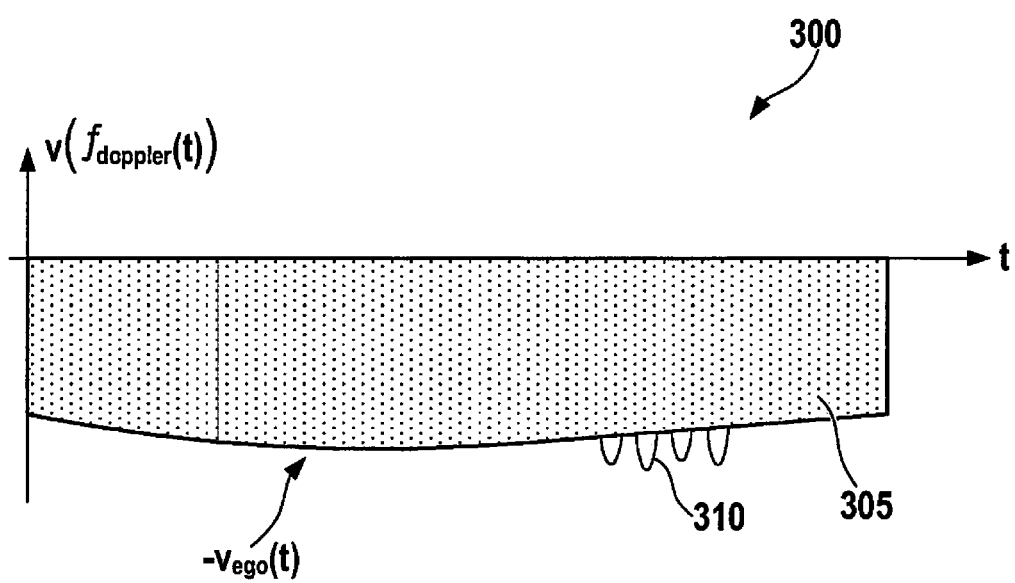
FIG. 3 shows an exemplary signal.

This correlation is illustrated in FIG. 3 in a diagram 300. Plotted in the horizontal direction is a time, and a velocity according to the Doppler frequency is plotted in the vertical direction. A base signal 305 represents objects 300 that are moving at a lower velocity than the ego velocity relative to second radar device 115, and thus are to be considered stationary. Individual peaks 310 correspond to objects 130 that are moving like pedestrians 130.

All other frequencies outside this range are not disturbed by a stationary object 130. In contrast thereto, the background clutter is distributed across a clearly greater frequency range in the other FMCW ramps.

For the pedestrian protection in the field of driver assistance, crossing pedestrians 130 are of particular relevance. In comparison with pedestrians 130 approaching from the front, the radial component of their movement in the direction of second radar device 115 may be clearly reduced, but it is not zero. Even if pedestrian 130 crosses a street on which motor vehicle 105 is moving in a perpendicular manner, the pedestrian does not move perpendicularly to second radar device 115. Nevertheless, for a crossing pedestrian 130, only the relative velocity of the leg swinging in the forward direction is typically greater than that of a stationary object 130 directly in front in the driving direction. Thus, only the corresponding frequency components must therefore be spectrally analyzed free of disturbance. Due to the slow but active movement of pedestrian 130 in the direction of second radar device 115, the micro-Doppler effect to be analyzed falls into the frequency range directly below the Doppler frequency corresponding to the negative ego velocity. An estimate of high quality for the ego velocity is normally available on board motor vehicle 105. The range in the frequency spectrum relevant for pedestrian 130 is therefore directly selectable.

In curves, due to the rotation movement, individual points of motor vehicle 105 have different velocities. The ego velocity of motor vehicle 105 is usually determined with reference to a vehicle rear axle. Because of a normally also known yaw rate of motor vehicle 105, it is easily possible to derive the corresponding velocity of a second radar device 115 installed in the front on that basis.

Because pedestrian 130 is approaching the roadway from the side, the measurable velocity is also reduced by the lateral offset in relation to the movement direction of radar device 110, 115. Pedestrian 130 is subject to the same reduction in the apparent velocity as stationary objects 130 under the same viewing angle. On the other hand, the radial component of the actual pedestrian movement is increased due to the greater viewing angle at the same movement direction of pedestrian 130.

Micro-Doppler Analysis

Similar methods as for stationary ERADAR systems having a constant transmit frequency are suitable for the actual analysis of the micro-Doppler. However, due to the masking of a large portion of the micro-Doppler spread, mainly the strength of the micro-Doppler output, the width of the unmasked spread, the amplitude of the fluctuation of this width over the time, and also the temporal interval/period between two maximum spreads (and thus the measured step frequency of pedestrian 130), are decisive.

In addition, it should be taken into account in this analysis that a pedestrian 130, by definition, has a stationary component (the foot on the ground) and that the power maximum is given by the torso. Accordingly, there is no gap (without signal power) between the Doppler frequency belonging to the negative ego speed and the micro-Doppler spread of pedestrian 130. As a result, it also speaks against the classification of an object 130 as a pedestrian 130 if the spectral maximum is at a significant distance from this Doppler frequency associated with the negative ego velocity.

What is claimed is:

1. A system for scanning an object from the direction of a motor vehicle, comprising:
    a first radar device for scanning a first item of information of the object, the first item of information including a distance, a first object angle, and a first relative velocity;
    a continuous-wave radar device for scanning a second item of information of the object, the second item of information including a second relative velocity and a second object angle; and
    a processing device for allocating the first item of information and the second item of information with regard to the same object, and for classifying the object based on a characteristic of the second relative velocity;
    wherein the processing device is set up to carry out a micro-Doppler analysis of signals from the continuous-wave radar device,
    wherein the object is movable in relation to an environment and exhibits micro-movements,
    wherein Doppler frequencies of one point of the object correspond to a zero velocity and Doppler frequencies of another point of the object correspond to a non-zero velocity, and wherein a spread between the zero velocity and the non-zero velocity fluctuates,
    wherein to determine a spectrum of velocities of the object, without requiring a complex modulation and/or a complex analysis of the radar signals, a location and/or a low-resolution movement of the object is determined with the first radar device, which uses a FMCW signal, wherein the micro movements of the object are determined with a second radar device and analyzed, using the micro-Doppler analysis, and wherein the second radar device uses a continuous-wave signal, so that it does not modulate the emitted radar signal over time,
    wherein the object is external to the vehicle and the radar devices are mounted on board the motor vehicle,
    wherein the determination using the continuous-wave signal is carried out for longer than a duration of a ramp of an FMCW process, so as to achieve a particular velocity resolution,
    wherein for both a processing of the continuous-wave signal of the second radar device and that of the FMCW ramps of the first radar device, a non-coherent integration across receive channels is followed by a spectral analysis using a Fourier transform, and in the processes, the signal is broken down into frequencies of which it is composed and a power of the frequency components in each frequency bin is determined, and
    wherein for the processing of the continuous-wave signal of the second radar device, in contrast to the FMCW ramps of the first radar device, frequency peaks are not detected and allocated, wherein each frequency bin having a power above a noise level directly indicates a presence of a physical object together with a corresponding velocity in a radial direction, so that the detection of frequency peaks is omitted, and wherein there is only a single continuous-wave signal for which an angle is able to be determined so that the calculation of an angle per ramp is unnecessary, and wherein for an available micro-Doppler, the frequency bins take the place of FMCW ramps.

2. The system as recited in claim 1, wherein the object is a pedestrian.

3. The system as recited in claim 1, wherein the first radar device includes a FMCW radar device.

4. The system as recited in claim 1, wherein the two radar devices are operated in alternation.

5. The system as recited in claim 4, wherein the two radar devices are integrated into an integrated radar device, which is operated sequentially using different signals.

6. The system as recited in claim 3, wherein a continuous-wave operation lasts longer than a frequency ramp of a FMCW operation.

7. The system as recited in claim 1, wherein a differential signal between an emitted and the continuous-wave radar signal reflected at the object is analyzed with regard to its frequency distribution.

8. The system as recited in claim 7, wherein a temporal characteristic of the frequency distribution is analyzed.

9. The system as recited in claim 8, wherein only frequencies are considered that lie below a limit frequency, which is determined based on a velocity of the radar devices in relation to the environment.

10. A method for scanning an object from the direction of a motor vehicle, the method comprising:
    scanning first items of information of the object using radar scanning, the first items of information including a distance, a first object angle, and a first relative velocity;
    scanning second items of information of the object using continuous-wave radar scanning, the second items of information including a second relative velocity and a second object angle;

allocating the first items of information and the second items of information with regard to the same object; and
classifying the object based on a characteristic of the second relative velocity;
wherein the processing device is set up to carry out a micro-Doppler analysis of signals from the continuous-wave radar device,
wherein the object is movable in relation to an environment and exhibits micro-movements,
wherein Doppler frequencies of one point of the object correspond to a zero velocity and Doppler frequencies of another point of the object correspond to a non-zero velocity, and wherein a spread between the zero velocity and the non-zero velocity fluctuates,
wherein to determine a spectrum of velocities of the object, without requiring a complex modulation and/or a complex analysis of the radar signals, a location and/or a low-resolution movement of the object is determined with the first radar device, which uses a FMCW signal, wherein the micro movements of the object are determined with a second radar device and analyzed, using the micro-Doppler analysis, and wherein the second radar device uses a continuous-wave signal, so that it does not modulate the emitted radar signal over time,
wherein the object is external to the vehicle and the radar devices are mounted on board the motor vehicle,
wherein the determination using the continuous-wave signal is carried out for longer than a duration of a ramp of an FMCW process, so as to achieve a particular velocity resolution,
wherein for both a processing of the continuous-wave signal of the second radar device and that of the FMCW ramps of the first radar device, a non-coherent integration across receive channels is followed by a spectral analysis using a Fourier transform, and in the processes, the signal is broken down into frequencies of which it is composed and a power of the frequency components in each frequency bin is determined, and
wherein for the processing of the continuous-wave signal of the second radar device, in contrast to the FMCW ramps of the first radar device, frequency peaks are not detected and allocated, wherein each frequency bin having a power above a noise level directly indicates a presence of a physical object together with a corresponding velocity in a radial direction, so that the detection of frequency peaks is omitted, and wherein there is only a single continuous-wave signal for which an angle is able to be determined so that the calculation of an angle per ramp is unnecessary, and wherein for an available micro-Doppler, the frequency bins take the place of FMCW ramps.

* * * * *